(12) United States Patent
Newsted et al.

(10) Patent No.: US 11,518,515 B1
(45) Date of Patent: Dec. 6, 2022

(54) AUTO ROTATING CANISTER

(71) Applicant: Government of the United States, as represented by the Secretary of the Air Force, Wright-Patterson AFB, OH (US)

(72) Inventors: Nicholas Newsted, Ft. Walton Beach, FL (US); Joseph Allison, Crestview, FL (US); David Adler, Niceville, FL (US); Brandon Lance, Crestview, FL (US); Robert Dome, Baker, FL (US); Arthur Chappelka, Pensacola, FL (US); Wendell Thompson, Fort Walton Beach, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 31 days.

(21) Appl. No.: 17/367,752

(22) Filed: Jul. 6, 2021

Related U.S. Application Data (63) Continuation of application No. 16/540,288, filed on Aug. 14, 2019, now Pat. No. 11,091,265.

(60) Provisional application No. 62/729,700, filed on Sep. 11, 2018.

(51) Int. Cl.
| | | |
|---|---|---|
| *B64C 27/00* | (2006.01) | |
| *B64D 1/08* | (2006.01) | |
| *B64D 1/14* | (2006.01) | |
| *B64C 27/54* | (2006.01) | |
| *B64C 27/20* | (2006.01) | |

(52) U.S. Cl.
CPC ............... *B64D 1/14* (2013.01); *B64C 27/20* (2013.01); *B64C 27/54* (2013.01); *B64D 1/08* (2013.01); *B64C 2201/027* (2013.01); *B64C 2201/128* (2013.01); *B64C 2201/145* (2013.01); *B64C 2201/18* (2013.01); *B64C 2201/206* (2013.01)

(58) Field of Classification Search
CPC ........... B64D 1/14; B64C 27/20; B64C 27/54; B64C 2201/027; B64C 2201/128; B64C 2201/145; B64C 2201/18; B64C 2201/206
See application file for complete search history.

(56) References Cited

U.S. PATENT DOCUMENTS

| | | |
|---|---|---|
| 2,324,146 A | 7/1943 | Frazer |
| 2,450,992 A | 10/1948 | Sanderson |
| 2,495,486 A | 1/1950 | Stevenson |
| 2,978,211 A | 4/1961 | Wannlund et al. |
| 3,115,831 A | 12/1963 | Suter |
| 3,168,267 A | 2/1965 | Ferris |
| 3,194,519 A | 7/1965 | Rhodes |
| 3,333,643 A | 8/1967 | Girard |
| 3,773,433 A | 11/1973 | Hollrock |
| 3,818,428 A | 6/1974 | Phipps |
| 4,017,043 A | 4/1977 | Barzda |

(Continued)

*Primary Examiner* — Brian M O'Hara
(74) *Attorney, Agent, or Firm* — AFMCLO/JAZ; Matthew D. Fair (57) ABSTRACT

An apparatus for air dropping equipment and supplies from an aircraft is disclosed herein. The apparatus includes a canister having a rotor system configured to slow the descent at a predetermined altitude to a desired landing speed via auto-rotation and/or with motor assist. The rotor system is configured to prevent the container from spinning about its longitudinal axis during the descent.

19 Claims, 6 Drawing Sheets

(56) References Cited

U.S. PATENT DOCUMENTS

| | | |
|---|---|---|
| 5,577,689 A | 11/1996 | Haro |
| 5,947,419 A | 9/1999 | Warren |
| 6,712,317 B1 | 3/2004 | Warren |
| 6,942,184 B1 | 9/2005 | Morris |
| 7,976,310 B2 | 7/2011 | Bachelder |
| 8,210,465 B2 | 7/2012 | Merems |
| 10,279,898 B2 * | 5/2019 | Green .................... B64C 27/50 |

* cited by examiner

AUTO ROTATING CANISTER

PRIORITY

This Application is a continuation of patent application Ser. No. 16/540,288 filed on Aug. 14, 2019, currently pending which claims benefit to provisional patent application No. 62/729,700 filed on Sep. 11, 2018.

RIGHTS OF THE GOVERNMENT

The invention described herein may be manufactured and used by or for the Government of the United States for all governmental purposes without the payment of any royalty.

TECHNICAL FIELD

The present disclosure generally relates to an air dropped canister, and more particularly, but not exclusively to an air dropped canister having a rotor system for controlling the rate and direction of the descent.

BACKGROUND

Delivery of supplies and equipment via air drop canisters or containers can be used in support of military operations or for civilian populations under emergency conditions. In militarized regions aircraft landing can be dangerous and in remote wooded or mountainous regions landing an aircraft can be impossible. In such regions the only practical way of delivering supplies is via an air drop from an airplane or helicopter. Prior art air drop apparatus have various shortcomings relative to certain applications. For example, parachute drops are highly visible to enemy forces, relatively slow, and difficult if not impossible to control landing in a defined area. To overcome certain deficiencies of parachute drop apparatus, some prior art systems have included a bladed rotor. The mechanical, electrical and control systems on these prior art devices are too expensive for single use applications and have limited capability to perform mission requirements. For example, the resulting centrifugal force due to rotation or other uncontrolled movement of the container during descent can cause damage to the supplies and equipment within the container and thus have proven to be of limited practical use. Accordingly, there remains a need for further contributions in this area of technology.

SUMMARY

One embodiment of the present disclosure includes an auto-rotating canister ARC) defined by a canister or container having a controllable rotor system connected thereto. The ARC is suitable for holding supplies and being air dropped from an aircraft. Other embodiments include apparatuses, systems, devices, hardware, methods, and combinations for a container with a rotor system configured to slow the descent of the container during an air drop via auto-rotation from a predetermined altitude until landing at a desired landing zone. In yet other embodiments, electric motors and or small engines may be operably coupled to the rotor system to assist in control of the rotor blade collective and speed control. Further embodiments, forms, features, aspects, benefits, and advantages of the present application shall become apparent from the description and figures provided herewith.

BRIEF DESCRIPTION OF THE FIGURES

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the drawings and figures depicted herein illustrate one or more exemplary embodiments of the present invention, but do not define the entire scope of the invention. The drawings are not necessarily to scale and may present a somewhat simplified representation of various features illustrative of the basic principles of the invention. The specific design features of the sequence of operations as disclosed herein, including, for example, specific dimensions, orientations, locations, and shapes of various illustrated components, may vary in part by the particular intended application and use environment. Certain features of the illustrated embodiments have been enlarged or distorted relative to others to facilitate visualization and clear understanding.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As shown in the disclosed embodiments, an Auto Rotating Canister (ARC) includes a container suitable for holding supplies and equipment and being dropped from an aircraft at various altitudes. The ARC includes a top-plate assembly configured to support electronic systems or portions thereof and includes pivot connections for attaching one or more movable arms to the canister. Each arm includes a rotor having a plurality of rotatable blades that are operable to control roll, yaw, pitch and lift forces of the rotor system. The lift force defines a descent rate of the ARC and the roll, pitch and yaw forces define directional control. The electronic systems control the rotor blade pitch on each of the blades of the rotor system with assistance from one or more servomechanisms ("servo"). In one form, a servo is connected to each arm and is operably coupled to GPS sensors and an autopilot control system to provide directional and descent control for the ARC. One or more batteries, electrical generators and/or other electrical/electromechanical components can be housed in the ARC to power and control the rotor system.

The ARC can be deployed from different aircraft platforms and used for a variety of purposes. Exemplary uses include carrying preloaded packages for survival needs such as communication devices, food, water, tools and weapons, etc. The ARC can be carried on an aircraft under a wing, in a cargo hold, in a main cabin or other locations that advantageously permit deployment at a desired altitude. In one form, the control system for the ARC is programed with the coordinates for the desired landing location and any needed waypoints before release from the aircraft. The control system can be pre-programmed and then subsequently reprogrammed after deployment from the aircraft via wireless communication command signals. After the ARC lands, the canister can be opened and the supplies are readily retrievable. In some embodiments the canister may be made from biodegradable material such as cardboard or other such materials known to those skilled in the art. In this manner the canister may be left behind with no environmental foot print.

In one form, the ARC includes a drum container or canister with a top hatch cover or lid secured thereto. The top hatch is configured to hold various components and is removable from the container so that it can be recovered and reused for multiple deployments. Such components can include, but are not limited to, an electronic controller, power supply components, batteries, actuators, electric motors and miniature internal combustion engines, etc. It should be understood that at least some of components can also be positioned partially or completely outside of the top hatch. The arms of the ARC extend from the top hatch though a pivot connection configured to permit the arms to move from a stowed position to a deployed position during free fall from an aircraft.

The ARC can include Radio Controlled (R/C) components in some embodiments. The ARC can be controlled by an autopilot controller which transmit and receives command and control signals via radio modem to a ground control station, to an aircraft control station and/or to various electronic controlled components on the ARC. A control station operator can transmit control signals to the ARC while descending to change the pre-determined drop location to a new drop location in real time. An on-board GPS module can be used to provide location data to the electronic controller for use in determining required command signals to be transmitted to the rotor system for controlling the flight path of the descending ARC. By way of example and not limitation, a 3 cell Li-On 3000 mAH battery can be used as an optional power source in certain embodiments to provide power to the control system components.

In one embodiment, the ARC may incorporate electronic sensors for altitude and position measurement suitable for providing feedback signals to the control system. The altitude position sensors can include a GPS sensor capable of communication with a satellite GPS system, a barometer for measuring atmospheric pressure and a Laser Altimeter (LIDAR) for measuring distance to a target location by illuminating a target with a laser light and measuring the reflected light pulses with a sensor. The GPS and Barometer sensors are typically used at relatively higher altitudes and the Laser Altimeter is typically used for detecting height above ground at relatively lower altitudes.

The ARC can be controlled by an autopilot used for variable collective multiple rotor systems such as those used on drones or the like. The rotor system includes at least two rotors that are designed to rotate in opposing directions so that there is no net torque on the container. In the disclosed form the autopilot is configured to control the variable collective in four rotors to achieve attitude and directional control of the ARC. The net torque from the rotor system must be zero to prevent rotation of the container during descent. The control system controls the collective on the rotor heads to vary roll, pitch and/or yawing moments on the ARC during descent. In this manner the control system can navigate the ARC to the designated landing zone.

In one exemplary embodiment, the total loaded ARC weight is approximately seventy (70) pounds. Using disk theory, the ARC can be scaled up or down depending on mission requirements. However, when scaling up/down the number of blades may increase/decrease and/or get larger/smaller. The ARC system has the capacity to be sized for a wide range of differing capabilities and some of the components may not change with differing ARC sizes. For instance, if the ARC is increased in size to carry additional weight, the electronic components may remain unchanged while certain components, like the blades, hinges, and rods may increase in proportional size. A scalability equation labeled as Eq. (1) shows that for a desired weight ($W_{total}$) and descent velocity ($Vd^2$) a total blade area ($A_{blades}$) can be determined. This permits design and fabrication flexibility for different ARCs having variable load capacity.

$$A_{blades} = 0.6 * \frac{V_d^2}{W_{total}} \qquad \text{Eq (1)}$$

In one form the control system stores energy in the rotating blades during descent and then uses auto-rotation at a predetermined threshold altitude to guide and slow the descent to a desired landing velocity. In other forms, an addition of a power source may be used to boost the blade speed and increase capability of the ARC. A power source, such as an appropriately sized engine and/or an electric motor, can be installed so as to supplement the auto-rotation control. This power source provides additional energy to the blades, sequentially improving aerial performance during descent. The improved aerial performance can provide the system with an increased range for landing, increased weight capacity and with a decreased impact velocity.

In some embodiments, a battery charging circuit may be operably coupled to the rotor system. In this manner, the rotational energy of the rotors is converted to electrical energy and stored in a battery system until the ARC requires it for a flare maneuver at final descent. Using relatively small motors on each rotor head can provide the additional power needed to further control the trajectory, slow the descent rate and provide a more precise time of arrival of the ARC. In some embodiments of the ARC system can include swarming technology to provide means for controlling large numbers of ARCs in a manner that prevents collisions with one another during the air drop.

Figure 1:
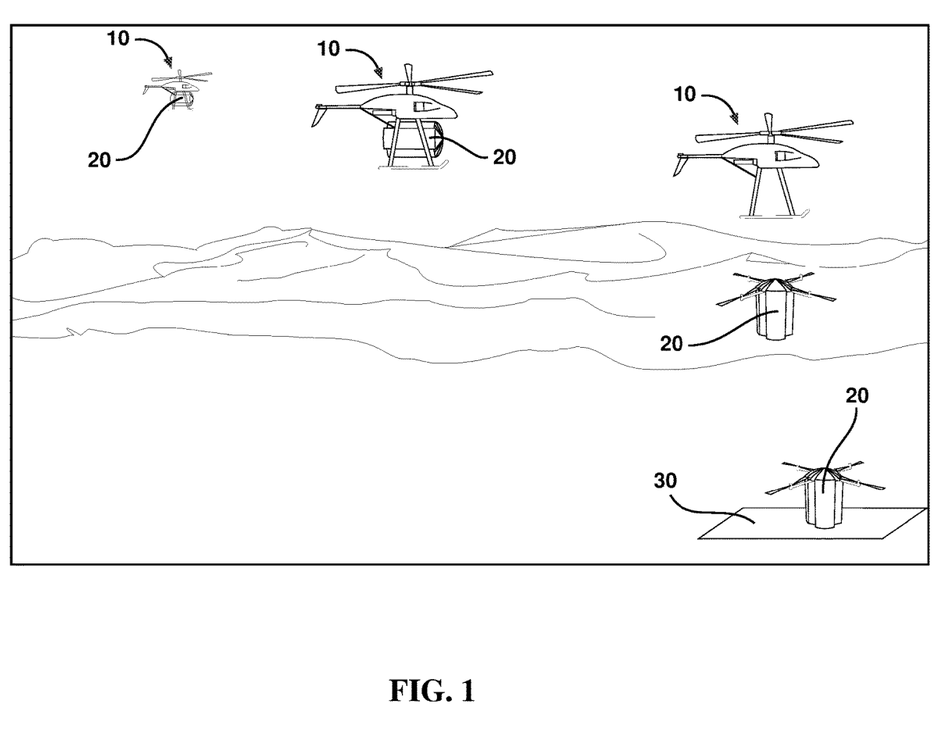
FIG. 1 is a schematic view of an exemplary aircraft delivery system for an air dropped auto rotation canister (ARC)

Referring now to FIG. 1, a schematic view of an exemplary aircraft delivery system 10 for an air dropped auto rotation canister (ARC) 20 is depicted. The aircraft depicted in the illustrative embodiment is a helicopter, however it should be understood that any aircraft can be used for delivering the (ARC) 20 near a landing zone 30. The aircraft can include any fixed wing or rotary wing configuration and can also be manned or unmanned (e.g. remote piloted drone or autopilot drone).

Figure 2:
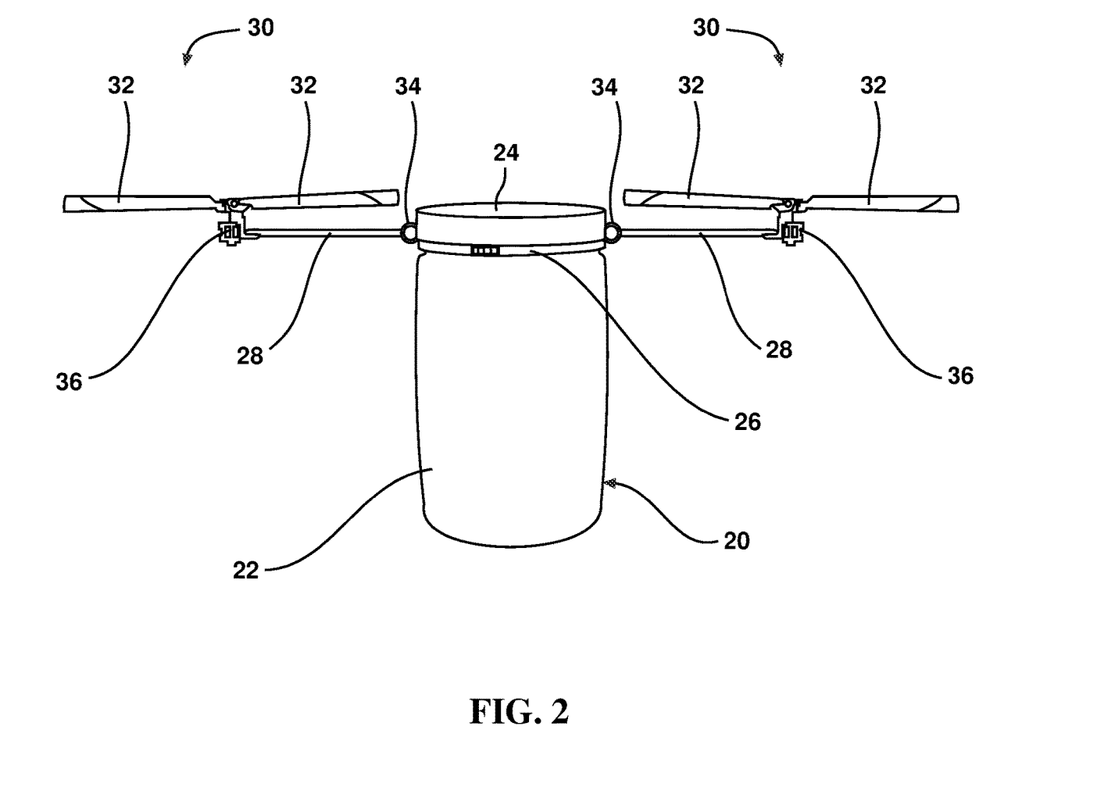
FIG. 2 is a side view of the auto rotation canister (ARC) with rotor arms in a deployed position.

FIG. 2 is a side view of the auto rotation canister (ARC) 20. The ARC 20 includes a canister or drum 22 configured to hold a payload or cargo that is to be delivered to the landing zone 30. A top hatch assembly or lid 24 can be removably attached to the canister 22 to hold the cargo therein. The top hatch 24 can be connected to the canister 22 via any mechanical means including, but not limited to latches, hinges, threaded fasteners, clamps and adhesives. In the illustrative embodiment, a band clamp 26 is depicted as one optional configuration to attach the top hatch 24 to the canister. At least two rotor arms 28 are connected via hinge 34 to the ARC 20. A rotor 30 is rotatably connected to the rotor arm 28 to provide lift and direction control of the ARC 20 during an air drop. The ARC 20 includes at least two rotor arms so that the net torque can be zeroed out and prevent the ARC 20 from spinning and possibly damaging the cargo as it is falling to the landing zone 30. In one embodiment, the rotor arms 28 are connected to the top hatch 24, however in alternate embodiments, the rotor arms 28 can be connected to the canister 22. Each rotor 30 includes at least two rotor blades 32, but may include more than two blades 32 in some embodiments. A collective 36 rotatably connects the rotor blades 32 to the rotor arm 28 and is operable to control the pitch angle of the blades 32 to control the lift and directional forces generated thereby as one skilled in the art would readily understand. In some forms the collective 36 is connected to an electric motor/generator to provide additional power to the rotor 30 and/or generate electrical power during autorotation. The electrical power can be delivered directly to electronic components or stored in a battery for future use.

Figure 3:
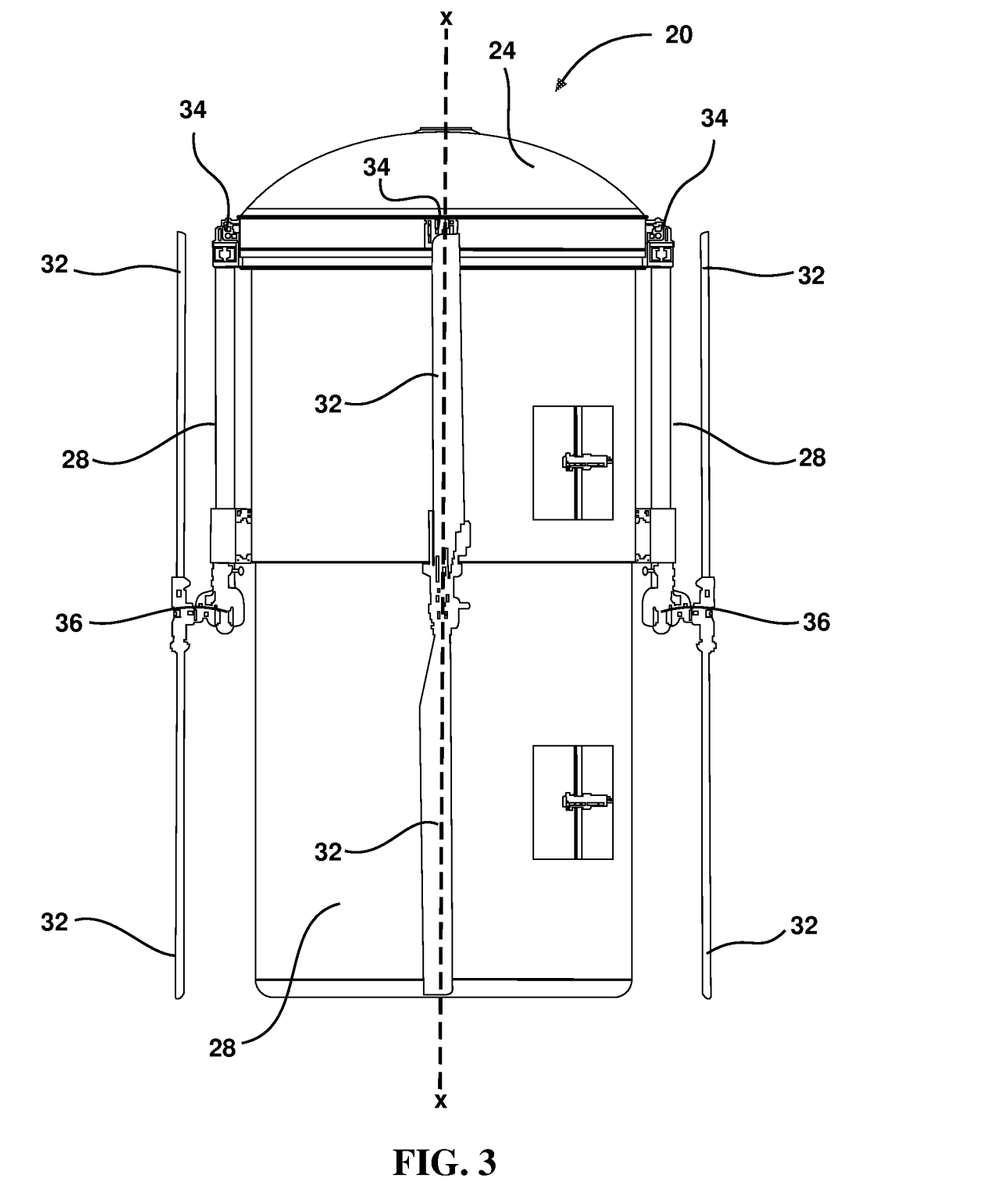
FIG. 3 is a side view of the auto rotation canister (ARC) with rotor arms in a stowed position.
Figure 4:
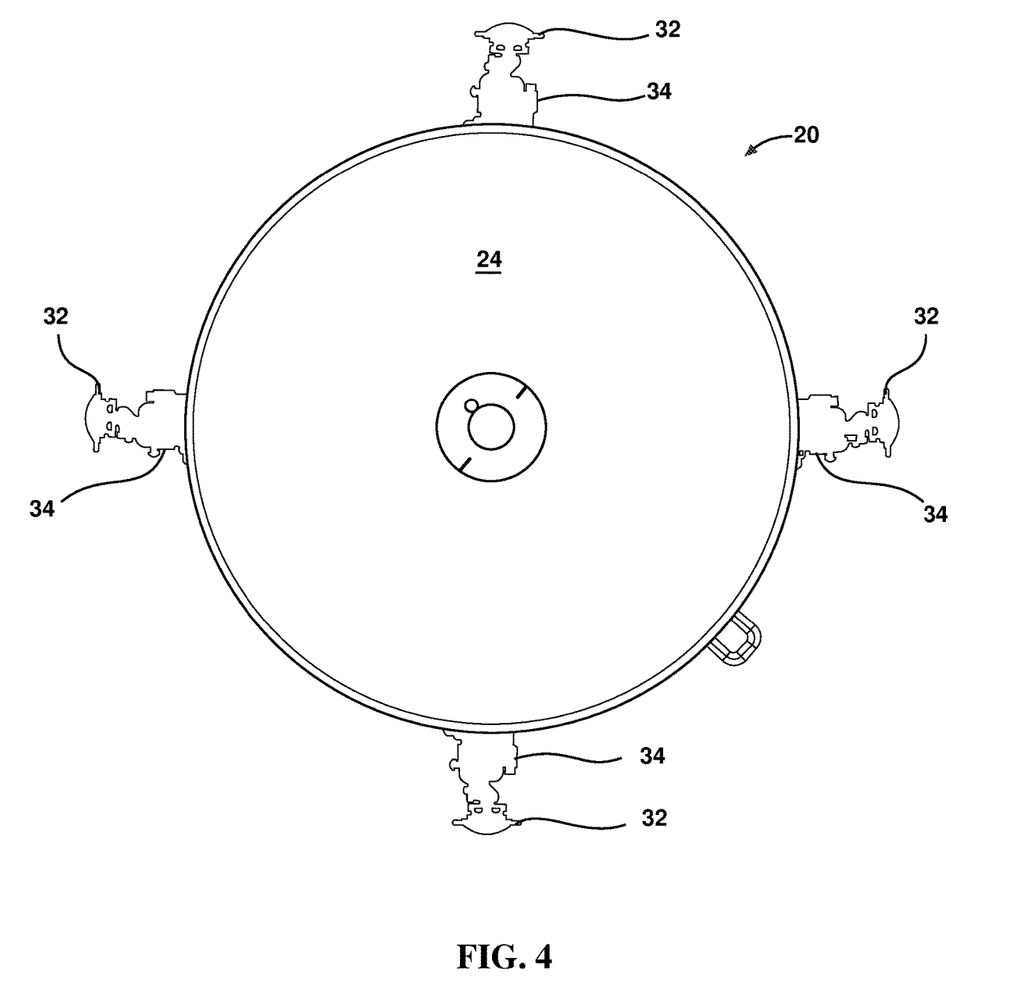
FIG. 4 is a top view of the auto rotation canister (ARC) with rotor arms in a stowed position.

FIG. 3 is a side view and FIG. 4 is a top view of the auto rotation canister (ARC) 20 with the rotor arms 28 pivoted down in a stowed position. In the stowed configuration the rotor arms 32 are substantially parallel to a longitudinal axis X of the ARC 20 to reduce the space claim and footprint when positioned on the aircraft.

Figure 5:
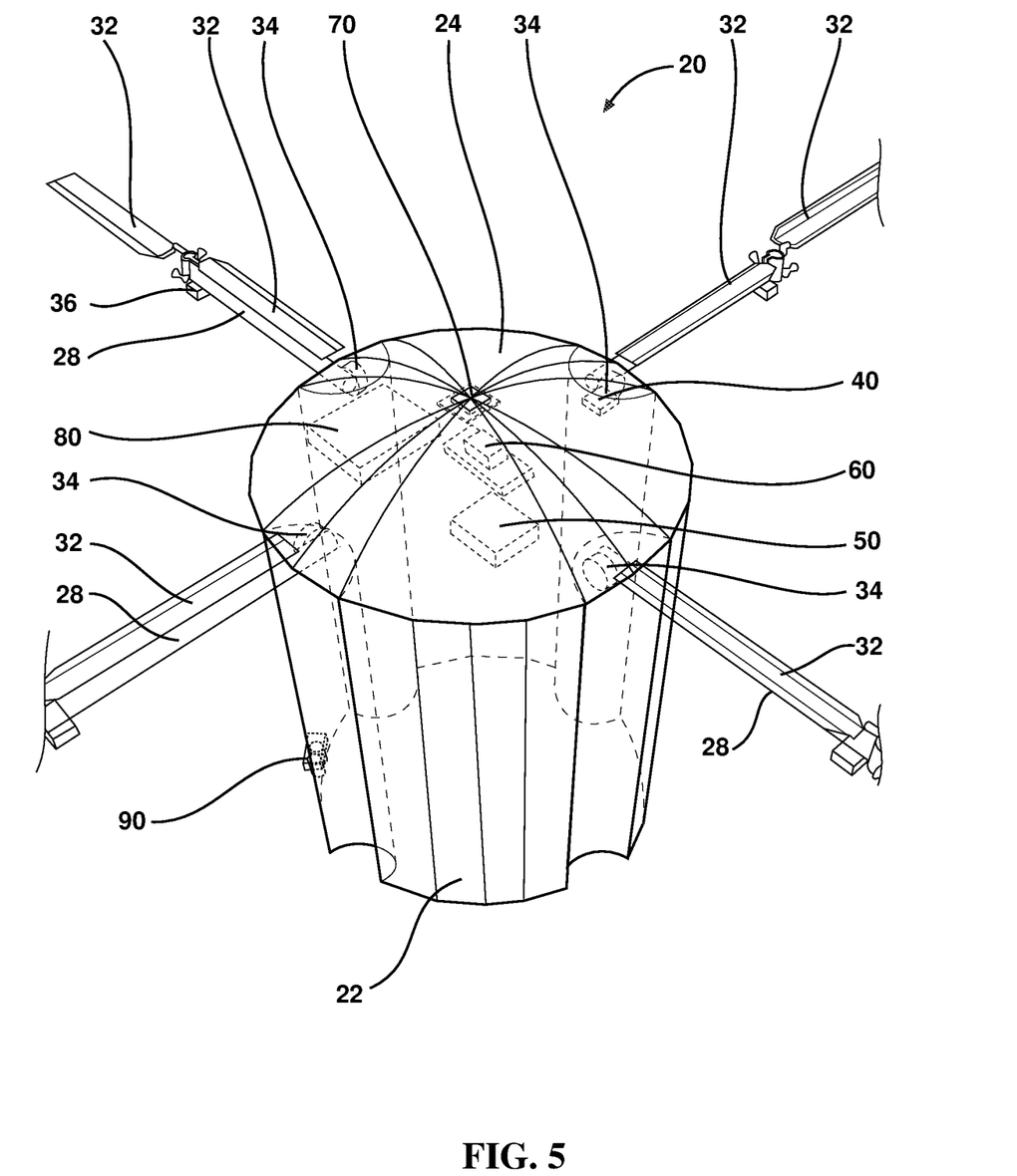
FIG. 5 is a partial perspective view of the auto rotation canister (ARC) with schematic illustrations of electronic components connected thereto.

FIG. 5 is a partial perspective view of the ARC 20 with schematic illustrations of electronic components assembled in the top hatch 24. The electronic components are configured to provide operational control of the ARC 20. An R/C receiver 40 can be configured to receive electronic control signals transmitted from a remote location. In one exemplary form, the R/C receiver 40 can be a Spektrum 2.4 GHz receiver. A modem 50 can provide means for communication for operational control. In one exemplary form, the modem 50 can be a Microhard N920 serial Modem. An electronic controller for an autopilot 60 is operable for receiving signals from electronic components on the ARC 20 and for controlling the rotor blades 32 of the rotors 30 to provide a desired drop speed and directional trajectory during the air drop. In one exemplary form, the autopilot 60 is a Pixhawk 2.1 however, other controllers may be used with disclosed system. A Global positioning sensor (GPS) 70 is operable for communicating with a GPS satellite to determine the position of the ARC 20 relative to the location of the desired landing zone 30. A power supply 80 can include batteries and other control systems necessary for operation of the ARC 20. In one exemplary form, the power supply 80 can be a Thunder Power 4S 5000 mAH. A laser altimeter 90 can be used to determine a height and vertical speed of the ARC 20. In one exemplary form, the laser altimeter can be a Garmin LIDAR. A servomotor can be operably connected to the collective 36 of each rotor system 30 to change the pitch of the blades 32 as required to change the velocity of the ARC 20.

Figure 6:
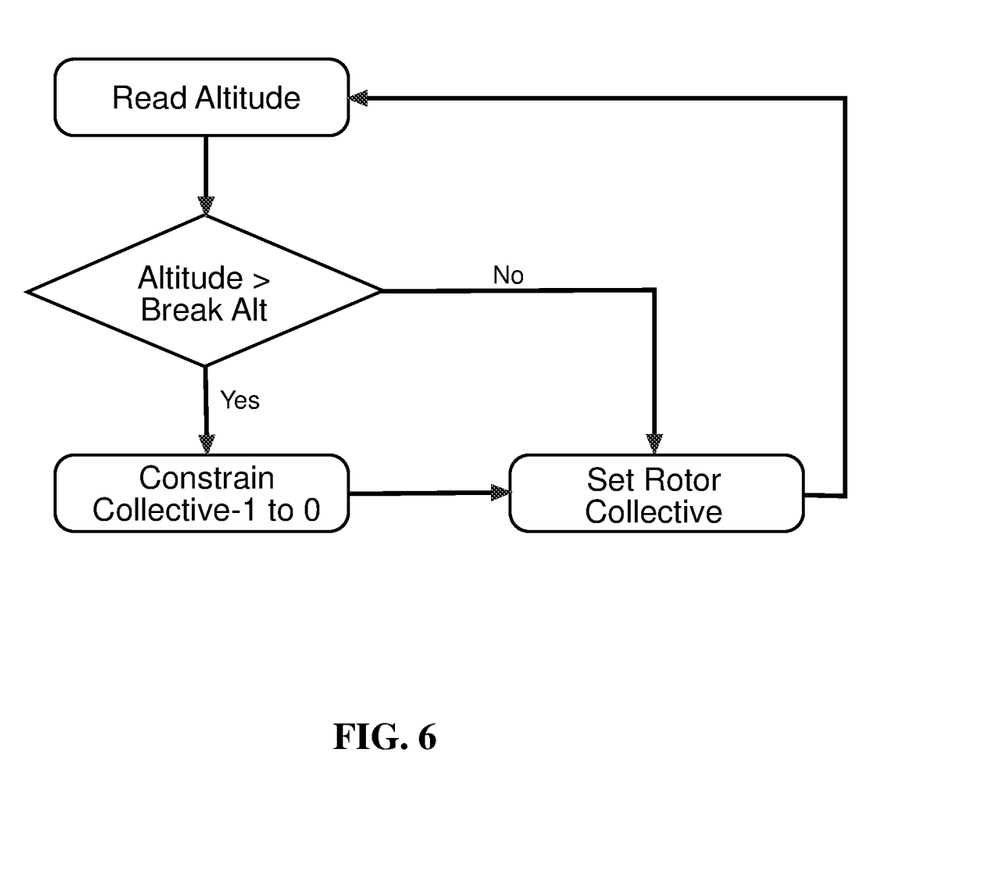
FIG. 6 is an exemplary control algorithm that may be used to control the auto rotation canister (ARC) in some embodiments thereof.

FIG. 6 is an exemplary control algorithm that may be used to control the auto rotation canister (ARC) in some embodiments thereof. The control system can use a limited collective algorithm based upon a current altitude of the ARC. When the ARC is higher than a threshold break altitude, the collective is constrained from between a maximum negative collective position (−1.0) and a neutral collective position (0). When the ARC is above the threshold break altitude, the force or drag on the rotor blades cause the rotor system to store energy and to slow its descent rate. At 0 collective the ARC will have maximum drag and will not descend any slower. Once the ARC has achieved its break altitude, the control system will relieve the constraints on the collective to allow the ARC to trade rotor energy for reduction in descent rate which is sometimes called a "flare." In one form the threshold break altitude is approximately fifty (50) foot.

In one aspect the present disclosure includes an air dropped canister assembly comprising: a canister for holding cargo; at least two rotors having a plurality of rotor blades operably coupled to the canister through a rotor arm; a control system operable for controlling the rotors; wherein the controller permits free fall of the canister until the canister reaches a predetermined altitude; and wherein the rotors auto rotate during free fall; wherein the controller changes the angle of attack of the rotor blades at the predetermined altitude; and wherein the rotors slow the canister descent rate from the predetermined altitude to a desired landing velocity.

In refining aspects, the canister assembly includes: a top hatch assembly releasably connected to the canister; a hinge connected to the rotor arms; wherein the hinge permits the rotor arms to move between a stowed position and a deployed position during free fall; wherein the rotor arms are substantially parallel to a longitudinal axis of the canister in the stowed position and substantially perpendicular to the longitudinal axis of the canister in the deployed position; a collective operably connected to the rotors to control the pitch of the blades; a global positioning sensor operably coupled to the canister; an altitude sensor operably coupled to the canister; a modem operably coupled to the canister; a motor and/or electrical generator operably coupled to the canister; and a battery operably coupled to the canister.

In another aspect, the present disclosure includes a method comprising: coupling at least two multi-bladed rotors to a canister; releasing the canister from an aircraft during flight; rotating the rotors during a free fall descent; changing an angle of attack of the rotor blades at a predetermined altitude; and slowing a speed of descent of the canister from the predetermined altitude to a desired landing speed.

In refining aspects the predetermined altitude is approximately fifty feet and the method includes moving rotor arms from a stowed position to a deployed position during the free fall; auto-rotating the rotors after the rotor arms are in the deployed position; and rotating the rotors with an electric motor after the rotor arms are deployed.

In yet another aspect the present disclosure includes an apparatus comprising: a canister configured to hold payload dropped from an aircraft; a canister top hatch releasably connectable to the canister; a plurality of rotor arms hingedly connected to the canister top hatch; a bladed rotor rotatably connected to each rotor arm; a plurality of electronic components operably coupled to the canister and/or the canister lid; and wherein the rotor arms pivot from a stowed position to a deployed position while the canister is falling to a landing zone.

In refining aspects the electronic components include an electronic control system operable for controlling a velocity and descent rate of the container with a collective adapted to change a pitch of the blades; the control system changes an angle of attack of the rotor blades at a predetermined altitude during a free fall descent to slow a speed of the canister to a desired landing speed; and the electronic components include one or more of an electric motor, a power generator, a modem, a GPS, a battery, an altimeter, a receiver, a transmitter, an electronic controller, an autopilot, a servo, and a power supply system.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An air dropped canister assembly comprising:
   a canister for holding cargo;
   at least two rotors having a plurality of rotor blades operably coupled to the canister through a rotor arm;
   a motor coupled to each of the at least two rotors;
   a control system operable for controlling the rotors;
   wherein the control system is configured to:
   permit free fall of the canister until the canister reaches a predetermined altitude; and
   auto rotate the rotors during free fall;
   control an angle of attack of the rotor blades at the predetermined altitude; and
   direct the motors to provide additional power to the at least two rotors to slow the canister descent rate from the predetermined altitude to a desired landing velocity.

2. The canister assembly of claim 1, further comprising a top hatch assembly releasably connected to the canister.

3. The canister assembly of claim 1, further comprising a hinge connected to the rotor arms.

4. The canister assembly of claim 3, wherein the hinge permits the rotor arms to move between a stowed position and a deployed position during free fall.

5. The canister assembly of claim 4, wherein the rotor arms are substantially parallel to a longitudinal axis of the canister in the stowed position and substantially perpendicular to the longitudinal axis of the canister in the deployed position.

6. The canister assembly of claim 1, further comprising a collective operably connected to the rotors to control the pitch of the blades.

7. The canister assembly of claim 1, further comprising a global positioning sensor operably coupled to the canister.

8. The canister assembly of claim 1, further comprising an altitude sensor operably coupled to the canister.

9. The canister assembly of claim 1, further comprising a modem operably coupled to the canister.

10. The canister assembly of claim 1, wherein the motors include an electrical generator operably coupled to the canister.

11. The canister assembly of claim 1, further comprising a battery operably coupled to the canister.

12. A method comprising steps including:
    coupling at least two multi-bladed rotors to a canister;
    releasing the canister from an aircraft during flight;
    auto-rotating the rotors during a free fall descent;
    changing an angle of attack of the rotor blades at a predetermined altitude; and
    slowing a speed of descent of the canister from the predetermined altitude to a desired landing speed using electric motors to provide power to the at least two multi-bladed rotors.

13. The method of claim 12, wherein the predetermined altitude is approximately fifty feet.

14. The method of claim 12, further comprising moving rotor arms from a stowed position to a deployed position during the free fall.

15. The method of claim 14, wherein the step of auto-rotating the rotors is performed after the rotor arms are in the deployed position.

16. The method of claim 14, wherein the step of slowing a speed of descent is performed after the rotor arms are deployed.

17. An apparatus comprising:
    a canister configured to hold payload and be dropped from an aircraft;
    a canister top hatch releasably connectable to the canister;
    a plurality of rotor arms hingedly connected to the canister top hatch;
    a bladed rotor rotatably connected to each rotor arm;
    a plurality of electronic components operably coupled to the canister and/or the canister lid; and
    a control system operable for controlling the rotors;
    wherein the control system is configured to:
    permit free fall of the canister until the canister reaches a predetermined altitude; and
    auto rotate the rotors during free fall;
    control an angle of attack of the rotor blades at the predetermined altitude; and
    direct motors to provide additional power to the rotors to slow the canister descent rate from the predetermined altitude to a desired landing velocity.

18. The apparatus of claim 17, wherein the electronic components include an electronic control system operable for controlling a velocity and descent rate of the container with a collective adapted to change a pitch of the blades.

19. The apparatus of claim 17, wherein the electronic components include one or more of an electric motor, a power generator, a modem, a GPS, a battery, an altimeter, a receiver, a transmitter, an electronic controller, an autopilot, a servo, and a power supply system.

* * * * *